Patented Nov. 14, 1939

2,180,295

UNITED STATES PATENT OFFICE 2,180,295

METHOD OF PREPARING MELAMINE

David W. Jayne, Jr., Old Greenwich, Conn., assignor to American Cyanamid Company, New York, N. Y., a corporation of Maine No Drawing. Application March 7, 1939, Serial No. 260,329

8 Claims. (Cl. 260—248)

The present invention relates to a method of preparing melamine.

The first object of the invention is to devise a method wherein crystals of melamine of high purity may be readily obtained. Another object resides in a method of preparing melamine requiring only simple apparatus with relatively cheap operating costs.

These objects are accomplished by heating dicyandiamid in the presence of either monoethanolamine or diethanolamine. Where monoethanolamine is employed, melamine of extraordinary high purity may be obtained by dissolving the dicyandiamid in the monoethanolamine, heating the mixture to a temperature sufficient to cause an exothermic reaction to take place, cooling the reaction mixture to room temperature and leaching the product with water. Where diethanolamine is employed, melamine is obtained accompanied by such deamination products as melam and melem.

Example

A mixture of one part by weight of dicyandiamid and one part by weight of monoethanolamine was heated in an open vessel provided with suitable means of agitation. When the temperature of the mix reached 130° to 135° C., all of the dicyandiamid had dissolved in the monoethanolamine. At about 140° C., an exothermic reaction started which continued without further application of heat until a maximum temperature of 175° C. was reached. The temperature then started to recede and when it had dropped below 100° C., three parts of water were added. The resulting crystalline slurry was cooled to about 25° C. and filtered. The residue was washed thoroughly with cold water, then with ethyl alcohol and finally dried. The product was a dry, white, crystalline, sandy powder, which melted sharply at 354° C. and formed a picrate which melted at 311° C. showing it to be melamine of a high purity.

The monoethanolamine may function both as a heat buffer and as a reactant which, in the latter case, a part of the dicyandiamid may react with the amine to form a biguanide or a guanidine derivative. The by-product thus formed, being readily soluble in water, is easily separated from the melamine. The filtrate containing these and/or substances may also be worked up for their recovery or conversion.

It was also found that when dicyandiamid was heated with approximately twice its weight of diethanolamine to a temperature of about 240° C., melamine was produced along with considerable quantities of deamination products, such as melam and melem. Inasmuch as both the melamine and the deamination products have distinct fields of usefulness in and of themselves, the production of one to the exclusion of the other is not at all necessary.

It was further found that the production of melamine is negligible when dicyandiamid is heated in the presence of triethanolamine.

It will be understood that this invention is not limited to the proportions of dicyandiamid and ethanolamines as utilized above, to any particular mode of heating or temperature employed, or to any particular method of recovering the melamine from the reaction product mixture.

I claim:

1. A method of preparing melamine which comprises heating dicyandiamid in the presence of a substance chosen from the group consisting of monoethanolamine and diethanolamine.

2. A method of preparing melamine which comprises heating at atmospheric pressure a mixture of dicyandiamid and monoethanolamine.

3. Method of claim 2 in which the mixture is heated to a temperature of approximately 175° C.

4. Method of claim 2 in which the mixture consists of approximately equal parts by weight of dicyandiamid and monoethanolamine.

5. A method of preparing melamine which comprises mixing equal parts by weight of dicyandiamid and monoethanolamine, heating the mixture to about 175° C., cooling the reaction mixture to room temperature, slurrying the product in water and removing the melamine crystals therefrom.

6. A method of preparing melamine which comprises heating at atmospheric pressure a mixture of dicyandiamid and diethanolamine.

7. Method of claim 6 in which the mixture is heated to a temperature of approximately 240° C.

8. Method of claim 6 in which the mixture consists of approximately one part by weight of dicyandiamid to two parts by weight of diethanolamine.

DAVID W. JAYNE, Jr.